United States Patent Office 3,746,678
Patented July 17, 1973

3,746,678
AMINE-MODIFIED POLYALKYLENE OXIDES
Clarence R. Dick, Lake Jackson, and Eldon L. Ward, Angleton, Tex., assignors to The Dow Chemical Company, Midland, Mich.
No Drawing. Filed Sept. 13, 1971, Ser. No. 180,193
Int. Cl. C08g 23/20
U.S. Cl. 260—2 A
19 Claims

ABSTRACT OF THE DISCLOSURE

Water-soluble alkylene oxide polymer having pendant aminoalkylaminomethyl groups are obtained by reacting polyepichlorohydrin or similar polymer with an alkylenediamine or a polyalkylenepolyamine. These products can be lightly cross-linked by reacting with a difunctional reagent such as ethylene dichloride or epichlorohydrin without destroying their solubility in water. The products are drainage aids in paper pulp slurries or are intermediates for making such drainage aids.

BACKGROUND OF THE INVENTION

This invention relates to a chemical process for making water-soluble nitrogen-containing alkylene oxide polymers and to the novel products of that process.

It is known to react polyepichlorohydrin or similar polyalkylene polyethers containing reactive chloromethyl groups with diethylene triamine or triethylene tetramine in the presence of a strong base in proportions of about one mole of polyamine per reactive chlorine atom. The process is described by DeGroote et al., U.S. 3,251,852. The products thereby obtained are partially cross-linked and generally are only slightly soluble at best in water. They show little or no flocculating capacity in dispersions such as paper pulp slurries.

SUMMARY OF THE INVENTION

It has now been found that products having high solubility in water which are either superior flocculants or are intermediates readily convertible into superior flocculants are obtained by a process which comprises reacting at about 20–150° C.

(1) a chlorinated alkylene oxide polymer of the group: polyepichlorohydrin, poly(1,4 - dichloro-2,3-epoxybutane), a copolymer of epichlorohydrin and 1,4-dichloro-2,3-epoxybutane, and a copolymer of one or both of these with up to about an equal molar proportion of a lower alkylene oxide with (2) a polyamine of the group consisting of an alkylenediamine of 2–6 carbon atoms, a poly(lower alkylene) polyamine of 2–5 alkylene moieties, and a mixture thereof wherein (3) the proportion of (2) to (1) is at least about 3 moles of polyamine per chlorine atom in the chlorine-containing alkylene oxide polymer.

Preferably, the chlorinated alkylene oxide polymer is polyepichlorohydrin or a copolymer of epichlorohydrin with up to an equal molar proportion of a lower alkylene oxide, the polymer having an average molecular weight of from 450 to 500,000. The polyamine is preferably ethylenediamine, diethylenetriamine, triethylenetetramine, or 1,3-propanediamine.

Usually, flocculants having the highest activity are obtained by reacting the alkylene oxide polymer-polyamine product with a minor proportion of an aliphatic difunctional polyamine cross-linking reagent of 2 to about 30 carbon atoms such as an alkylene dihalide, an epoxyalkylene halide, an alkylene diepoxide, or a corresponding polyoxyalkylene compound. Proportions of up to 40 percent of cross-linking reagent based on the weight of alkylene oxide polymer-polyamine product are operable.

DETAILED DESCRIPTION

The chlorinated alkylene oxide polymer reactant of this process can be represented by the generic structural formula as follows:

where $a$, $b$ and $c$ represent integers whose values are determined by the composition and molecular weight limits set forth above and R is a lower alkylene radical of the group ethylene, propylene and butylene. Where this reactant is a polyepichlorohydrin, for example, $a=5$–$5500$ and $b$ and $c$ are each zero, for a polymer of 1,4-dichloro-2,3-epoxybutane, $a$ and $c$ equal zero and $b=3$–$3500$, and for a copolymer with alkylene oxide units, $c$ has a maximum value of $(a+b)$. It is understood that in a copolymer, the different alkylene oxide units can be in any random distribution or in blocks.

The polyamine reagent is preferably ethylenediamine, diethylenetriamine, triethylenetetramine, or 1,3-propanediamine as pointed out above, but polyamines such as tetramethylenediamine, 1,6-diaminohexane, tetraethylenepentamine, pentaethylenehexamine, propylenediamine, butylenediamine, tripropylenetetramine, 3,3'-iminobispropylamine, and other such polyamines are also operable. The proportion of polyamine to reactive chlorine atom in the alkylene oxide polymer reactant can vary from about three to a hundred or more, but for best results, a polyamine to chlorine ratio of about 3–10 is used for chlorinated alkylene oxide polymer reactants of relatively low molecular weight, e.g., 450 to 10,000 whereas for the higher molecular weight polymers, a polyamine to chlorine ratio of 10–50 is preferred.

The use of a solvent in the reaction is optional. When the reactants are both liquids, no solvent is necessary. When one or both of the reactants are solid or extremely viscous, a solvent which is inert to both reactants and product is advantageous. Ethers such as tetrahydrofuran and dioxane and hydrocarbons such as octane, cyclohexane, benzene, and xylene are examples of suitable solvents. No inorganic base or acid acceptor is required in the reaction.

While the reaction can be run at any temperature within the approximate range 20°–150° C., preferred operation is at 70°–100° C. and a convenient temperature is often the reflux temperature of the reaction mixture. Operation at atmospheric pressure is preferred but moderate pressure is sometimes convenient. The reaction time is that required to react all or essentially all of the chlorine atoms in the alkylene oxide polymer. This point is easily determined by analysis for ionic chloride in the reaction mixture. Reaction times of 0.5–20 hours are typical.

The products of this process are characterized by having pendant aminoalkylaminomethyl or amino(polyalkylamino)methyl groups attached to the alkylene oxide polymer backbone with some of these polyamine groups attached at each end to two such backbones, thereby constituting cross-linking radicals. The original chloromethyl groups in the starting chlorinated alkylene oxide polymer reactant are essentially completely reacted with amino groups because of the substantial excess of polyamine reagent employed.

Cross-linking reactants useful in the present process include: alkylene dihalides such as ethylene dichloride, butylene dichloride, 1,6-dichlorohexane, 1,4-dichloro-2-butene, and the corresponding bromides and iodides; epihalohydrins such as epichlorohydrin, 1-chloro-2,3- epoxybutane, epibromohydrin, and the like; diepoxides such as 1,2,3,4-diepoxybutane, 1,2,5,6-diepoxyhexane; and other such compounds. Also included are the corresponding polyoxyalkylene compounds which can be derived from lower alkylene polyglycols. Illustrative of this class are diglycidyl ether, diethylene glycol dichloride (2,2'-dichlorodiethyl ether), the diglycidyl ether of dipropylene glycol, and the dichloride of polyethylene glycol of about 600 molecular weight.

The cross-linking reaction can be carried out generally under the same conditions used for the polyamine-chlorinated alkylene oxide polymer reaction.

The products of this process, whether cross-linked or not, range from viscous liquids to semi-solids resembling soft gels. Generally, they are yellowish to amber in color. They are soluble in water.

These products are particularly useful as drainage aids for wood pulp slurries in papermaking. More generally, they are superior flocculants which are useful for treating sewage, water containing suspended mine tailings or slime, paper mill effluents, and the like. They are also useful pigment retention aids in paper manufacture.

EXAMPLE 1

A quantity of 1950 g. (32.5 g. moles) of ethylenediamine was heated to 100° C. in a suitably equipped reaction flask and stirred while 308.2 g. (3.33 g. mole equivalents of chloromethyl group) of polyepichlorohydrin of 2000 average molecular weight was added over a period of 12 hours. The resulting solution was stirred for an additional four hours at 100° C. and then cooled. The ionic chloride content was found at this point to be 100 percent of the theoretical quantity. The ionic chloride (present as amine hydrochloride) was neutralized by adding 560 g. of 25% aqueous NaOH and the precipitated sodium chloride was removed by filtration. Unreacted ethylenediamine was flash distilled from the product and the viscous residue was diluted with water to a 20% polymer concentration (Solution I).

A 200 g. portion of this intermediate product solution was heated to 90° C. and 6.4 g. of the diglycidyl ether of dipropylene glycol was added dropwise over five hours with stirring. The reaction product was a pourable but very viscous solution. The polymer product showed superior activity as a drainage aid when added to a paper pulp suspension in a concentration of about four pounds per ton of pulp (dry pulp basis).

EXAMPLE 2

Following the procedure of Example 1, 163 g. of the same polyepichlorohydrin was added to 378 g. of ethylenediamine (EDA:Cl mole ratio of 3.56:1) at 90° C. to produce a gelled product which, however, was completely soluble in water at 20% polymer solids concentration. The product was an active aid in promoting drainage of paper pulp suspensions.

EXAMPLE 3

As described in Examples 1 and 2, 58 g. of the polyepichlorohydrin was added to 180 g. of ethylenediamine, a ratio of 4.8 moles of diamine per reactive chlorine. A very viscous but ungelled solution was obtained. The product had the same activity as a paper pulp drainage aid as the product of Example 2.

EXAMPLE 4

Another 200 g. portion of the intermediate product solution of Example 1 was reacted with 5.0 g. of ethylene dichloride at 78° C. to obtain a gelled but water-soluble product. This product had superior activity as a paper pulp drainage aid similar to the final product of Example 1.

EXAMPLE 5

As described in Example 1, 176 g. of the same polyepichlorohydrin was added to 608 g. of diethylenetriamine (DETA:Cl mole ratio of 3.63:1) at 100° C. over an eight hour period. The resulting viscous solution was miscible with water and showed activity as a drainage aid in paper pulp. By partially cross-linking this product, a material having substantially higher activity as a drainage aid is obtained. Such cross-linking is accomplished by reacting the product with ethylene dichloride or other cross-linking reagent as previously described.

EXAMPLE 6

A solution of 10 g. of solid polyepichlorohydrin, average molecular weight=200,000, in 182 g. of tetrahydrofuran was added dropwise to 260.8 g. of ethylenediamine (EDA:Cl mole ratio=40.1) at 93° C. with stirring. After reaction for five hours at this temperature, the solution was cooled and analyzed to find that 88.5 percent of the theoretical quantity of ionic chloride was present. The solvent was flash-distilled from the reaction product and the resulting residue was diluted to one percent polymer solids with water. This solution showed superior drainage-promoting activity in paper pulp suspensions.

EXAMPLE 7

To 200 g. of Solution I (Example 1) at room temperature there was added 10 g. of epichlorohydrin as a cross-linking reagent. The resulting solution was heated at reflux temperature (105°–107° C.) for 13 hours to form a clear, viscous solution which showed moderate activity as a paper pulp drainage aid.

EXAMPLE 8

The procedure of Example 7 was repeated using 10 g. of 1,6-dichlorohexane as the cross-linking reagent. The solution gelled after heating at 105° C. for about one hour. It was diluted with water to 10% solids content and blended to a viscous solution with the aid of a high speed stirrer. This product had superior activity as a paper pulp drainage aid.

EXAMPLE 9

Following the procedure of Example 1, 235.8 gm. of the same polyepichlorohydrin dissolved in 64.2 gm. of benzene (added only to reduce viscosity and make addition easier) was added to 1,320 gm. of 1,3-propylenediamine at 89° C. over 45 minutes during which time the temperature of the reaction mixture rose to 127° C. The solution was cooled to 70° C. and 224 gm. of 50% aqueous NaOH was added. The product was filtered to remove NaCl and the propylenediamine was then removed by flash distillation. The product was then diluted to 20% solids in water.

Two hundred grams of this solution was then reacted with 6.0 gm. of ethylenedichloride at 80–100° C. to obtain a gelled but water-soluble product. The product was an active aid in promoting drainage of paper pulp suspensions.

EXAMPLE 10

A solution of 5.0 gm. of a solid, rubbery propylene oxide/epichlorohydrin copolymer (30/70 weight percent, respectively; molecular weight estimated 0.5 to 1 million) dissolved in 195 gm. of 1,4-dioxane was added dropwise to 114.0 gm. of ethylenediamine (EDA:Cl mole ratio =50:1) and at 105° C. with stirring. After reacting another 2.5 hours at this temperature the solution was cooled and 500 gm. of water was added. The dioxane/water azeotrope was removed by flash distillation and the resulting residue was diluted to 0.8% polymer solids with water. This solution showed superior drainage-promoting activity in paper pulp suspensions.

Examples A, B, C and D were run to illustrate the effects of using reaction procedures and reagent proportions outside the scope of the present invention. Three of the products (A, C and D) had litle or no solubility in water and none had substantial activity as drainage aids.

Example A

A solution was made up of 145 g. KOH and 240 g. of ethylenediamine in 700 g. of methanol. To this solution was added 186 g. of 2000 average mol. wt. polyepichlorohydrin diamine/chlorine mole ratio=2/1 at room temperature over a period of one hour. The resulting mixture was stirred at room temperature for 22 hours and then was heated to reflux temperature (76–79° C.) for 3.5 hours. After cooling to room temperature, the mixture was filtered to remove solid precipitate and methanol was evaporated off at 60–65° C. and 20 mm. Hg in a rotary evaporator. The residue was an opaque yellow viscous liquid, weight=168 g. Its water solubility was less than 1% and it showed no activity as a paper pulp drainage aid.

When the same proportions of ethylenediamine and polyepichlorohydrin as above were reacted in the absence of KOH by the method described in Examples 1–3, 5 and 6, the product was a solid gel with little or no water solubility.

Example B

Example A was repeated except for using 292 g. of triethylenetetramine in place of the ethylenediamine. The product was an opaque yellow viscous fluid which was soluble in water but showed no activity as a paper pulp drainage aid.

Example C

Over a period of one hour, 47.5 g. of polyepichlorohydrin, average molecular wt.=2000, was added to 146 g. of triethylenetetramine at 105° C. The product was a gel which was still a solid mass after addition of 300 g. of water. When dispersed in water, it showed slight activity as a drainage aid.

Example D

A solution of 41.0 gm. of the product obtained in Example B in 164 gm. of water was reacted with 5.0 gm. of 1,6-dichlorohexane for four hours at 90° C. with stirring. A water-insoluble powdery precipitate was obtained. Since it was water insoluble, it could not be used as an aid in promoting drainage of aqueous paper pulp suspensions.

The activity of these products as paper pulp drainage aids was determined by mixing the test polymer in a slurry of soft wood fibers beaten to a Canadian Standard Freeness of about 180–215 and measuring the freeness at different pH levels. Slurries were tested at pH 4.5 and 7.5 using a polymer concentration of 4 lbs. per 2000 lbs. of wood fiber. The freeness of the treated slurry was measured in total milliliters of water drained. The products from Examples A, B and C are included for purpose of comparison.

We claim:

1. A process for making an amine-modified alkylene oxide polymer which comprises reacting at about 20–150° C. (1) a chlorinated alkylene oxide polymer of the group polyepichlorohydrin, poly(1,4-dichloro-2,3-epoxybutane), a copolymer of epichlorohydrin and 1,4-dichloro-2,3-epoxybutane, and a copolymer of one or both of these with up to about an equal molar proportion based on the chlorinated alkylene oxide polymer of a lower alkylene oxide, (2) a polyamine of the group consisting of an alkylenediamine of 2–6 carbon atoms, a poly(lower alkylene)polyamine of 2–5 alkylene moieties, and a mixture thereof wherein (3) the proportions of (1) and (2) are at least about 3 moles of polyamine per chlorine atom in the chlorinated alkylene oxide polymer.

2. The process of claim 1 wherein the chlorinated alkylene oxide polymer is polyepichlorohydrin having a molecular weight of from 450 to 500,000.

3. The process of claim 1 wherein the chlorinated alkylene oxide polymer is a copolymer of epichlorohydrin and propylene oxide.

4. The process of claim 2 wherein the polyamine is ethylenediamine.

5. The process of claim 2 wherein the polyamine is diethylenetriamine.

6. The process of claim 2 wherein the polyamine is triethylenetetramine.

7. The process of claim 2 wherein the polyamine is 1,3-propanediamine.

8. The process wherein the amine-modified alkylene oxide polymer of claim 1 is reacted with up to about 40 weight percent of an aliphatic difunctional polyamine-cross-linking reagent of 2–30 carbon atoms which is an alkylene dihalide, a diepoxide, an epihalohydrin, or a lower alkylene polyglycol capped on the ends by epoxyalkyl- or haloalkyl-groups 9. The process of claim 8 wherein the cross-linking reagent is an alkylene dihalide, an alkylene diepoxide or an alkylene epihalohydrin.

10. The process of claim 9 wherein the cross-linking reagent is ethylene dichloride.

11. The water-soluble amine-substituted resin product of the reaction of (1) a chlorinated alkylene oxide polymer of the group polyepichlorohydrin, poly(1,4 - dichloro-2,3-epoxybutane), a copolymer of epichlorohydrin and 1,4-dichloro-2,3-epoxybutane, and a copolymer of one or both of these with up to about an equal molar proportion based on the chlorinated alkylene oxide polymer of a lower alkylene oxide with (2) a polyamine of the group consisting of an alkylenediamine of 2–6 carbon atoms, a poly(lower alkyl-

| Polymer Example No. | Drainage, ml. H₂O | | | Remarks |
|---|---|---|---|---|
| | pH 4.5 | pH 7.5 | Blank | |
| 1 | 500 | 490 | 180 | Crosslinked with diepoxide. |
| 2 | 370 | 385 | 210 | EDA/Cl=3.56/1. |
| 4 | 550 | 590 | 210 | Cross-linked with EDC. |
| 5 | 280 | 260 | 210 | DETA/Cl=3.6/1. |
| 6 | 470 | 485 | 215 | High mol wt. polyepi EDA/Cl=40/1. |
| 7 | 290 | 380 | 190 | Cross-linked with epi. |
| 8 | 485 | 540 | 190 | Cross-linked with 1,6-dichlorohexane. |
| 9 | 340 | 370 | 205 | 1,3-propanediamine derivative cross-linked with EDC. |
| 10 | 410 | 450 | 180 | High mol wt. PO/epi copolymer plus EDA, EDA/Cl=50/1. |
| A | 190 | 190 | 190 | EDA/Cl=2/1 (with solvent). |
| B | 200 | 190 | 190 | TETA/Cl=1/1 (with solvent). |
| C | 260 | 250 | 190 | TETA/Cl=2/1 (no solvent used). |

The products of this invention are also superior flocculants for treating systems such as municipal and industrial sewage. A product similar to that of Example 4, for example, showed better flocculating activity when used in activated sludge from municipal sewage at a concentration of 12.7 lbs. per ton of suspended solids than known flocculants such as anionic and cationic substituted polyacrylamides used in similar or higher concentrations.

ene)polyamine of 2–5 alkylene moieties, and a mixture thereof wherein (3) the proportion of (2) to (1) is at least about 3 moles of polyamine per chlorine atom in the chlorinated alkylene oxide polymer.

12. The resin of claim 11 wherein the alkylene oxide polymer is polyepichlorohydrin having a molecular weight of from 450 to 500,000.

13. The resin of claim 11 wherein the alkylene oxide polymer is a copolymer of epichlorohydrin and propylene oxide.

14. The resin of claim 12 wherein the polyamine is ethylenediamine.

15. The resin of claim 12 wherein the polyamine is diethylenetriamine.

16. The resin of claim 12 wherein the polyamine is triethylenetetramine.

17. The resin of claim 12 wherein the polyamine is 1,3-propanediamine.

18. The cross-linked product of reaction of the resin of claim 11 with up to about 40 weight percent of an aliphatic difunctional polyamine-cross-linking reagent of 2–30 carbon atoms which is an alkylene dihalide, a diepoxide, an epihalohydrin, or a lower alkylene polyglycol capped on the ends by epoxyalkyl- or haloalkyl-groups.

19. The product of claim 18 wherein the cross-linking reagent is ethylene dichloride.

References Cited

UNITED STATES PATENTS

| | | | |
|---|---|---|---|
| 3,331,788 | 7/1967 | Lorenson et al. | 260—2 |
| 3,391,090 | 7/1968 | Schiegg | 260—2 |
| 3,553,111 | 1/1971 | Ginilewicz et al. | 260—2 |
| 3,567,420 | 3/1971 | Legator et al. | 71—67 |

OTHER REFERENCES

Chem. Abstracts 60, 16054e (1964).
Chem. Abstracts 69, 35396k (1968).

WILLIAM H. SHORT, Primary Examiner

E. A. NIELSEN, Assistant Examiner

U.S. Cl. X.R.

162—164; 210—54; 260—2 BP, 29.2 EP